March 12, 1940.  A. W. JOHNSON  2,193,594
SCALE
Filed Sept. 26, 1936  4 Sheets-Sheet 1

FIG. 1.

INVENTOR
AARON W. JOHNSON
BY
Alton and Griswold
ATTORNEYS

March 12, 1940.   A. W. JOHNSON   2,193,594
SCALE
Filed Sept. 26, 1936    4 Sheets-Sheet 2

INVENTOR
AARON W. JOHNSON
BY
Orton and Griswold
ATTORNEYS

March 12, 1940.  A. W. JOHNSON  2,193,594
SCALE
Filed Sept. 26, 1936    4 Sheets-Sheet 4

INVENTOR
AARON W. JOHNSON
BY
Orton and Griswold
ATTORNEYS

Patented Mar. 12, 1940

2,193,594

UNITED STATES PATENT OFFICE 2,193,594

SCALE

Aaron W. Johnson, Springfield Gardens, N. Y.

Application September 26, 1936, Serial No. 102,656

34 Claims. (Cl. 249—14)

This invention relates to scales and more particularly to batch weighing scales of the kind having a plurality of scale beams which are selectively operable independent of or unitedly with the others for proportioning the component of material by weight measurement and such scales have been provided with operable means controlled by the scale beams for proportioning such components of aggregate material.

The present invention has for its object to provide for the fully automatic weighing of different ingredients in a definite sequence.

Another object of the invention is the provision of latches for the respective scale beams which are interlocked to prevent tampering with the weighing operation.

Yet another object of the invention is to provide mechanical operation of the beam latches. In a modification of the invention the interlocking of the beam latches is electrically effected.

The invention also seeks a scale having provision for fully automatic sequence weighing but in which the resetting is effected by hand.

Yet another object of the invention is the automatic resetting of the beam whereby a completely automatic cycle of weighing and dumping can be accomplished. Accordingly, the entire charge must be weighed correctly before the hopper or tank can be discharged and then it must be discharged completely before it is possible to commence the weighing cycle again.

These and other objects of the invention and the means for their attainment will be more apparent from the following detailed description, taken in connection with the accompanying drawings illustrating various embodiments by which the invention may be realized, and in which:

In the drawings, only so much of a batch weighing scale is illustrated as is necessary for an understanding of the invention. Four scale beams are illustrated, to wit, the tare beam 10 and capacity beams 12, 14 and 16, each provided with a poise or weight 18 to balance the beam. Each beam is independently fulcrumed at 19. The steel yard rod 20 of the scale beam 10 is connected to a suitable platform lever system, not shown, such as that of an adjacent platform scale or the like. The rod or link 21 is operatively connected with a weighing switch 22 which automatically connects the circuits of the beam controlling devices with a source of current when the tare beam 10 is balanced, as will hereinafter be explained. Pivotally mounted at the opposite end of the tare beam 10 is a stirrup 24 which comprises a generally rectangular frame provided with transverse bars in the form of bearings 26, 28 and 30 and on which are adapted to rest, respectively, the knife edges 32, 34 and 36 on the respective beams 12, 14 and 16.

Figure 3:
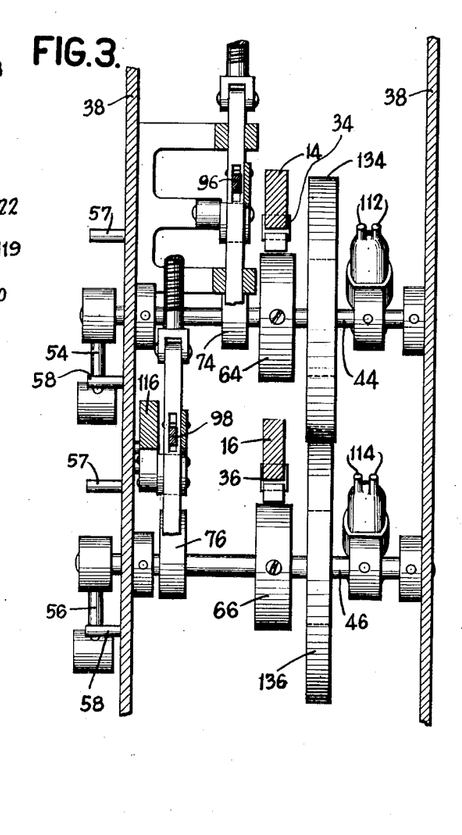
Figure 3 is a transverse vertical sectional view taken in the plane indicated by the line 3—3 of Figure 2 and looking in the direction of the arrows.

Provision is made for throwing any one or all of the beams 12, 14 and 16 out of action into a zero or neutral position by lifting and bodily removing the weight of any or all of the scale beams 12, 14 and 16 from the tare beam 10. This is accomplished by lifting one or more of the beams 12, 14 or 16 off the respective bearings 26, 28 and 30. To this end there is mounted in a suitable frame (Figure 3) comprising, in the illustrated embodiment, spaced plates 38, a plurality of shafts disposed conveniently in a transverse vertical plane one for each beam and at a suitable distance below the beam. The shaft used in conjunction with the beam 10 is indicated at 40. This is a shaft for a switch which operates independently of the cyclic operation later to be described. It may be disposed at any other point equally as well. The shaft for the beam 12 is indicated at 42. The shaft for the beam 14 is indicated at 44 and the shaft for the beam 16 is indicated at 46. Figure 3 illustrates the parts associated with the beams 14 and 16. For the purpose of this description, it will be assumed that the switch operating mechanism for beam 10 is also mounted on a shaft journalled in plates 38. Each shaft, at its one end, say, the front end for convenience of actuation, extends forwardly of the front plate 38 and has mounted thereon a handle 50, 52, 54 and 56 whereby the shaft may be rotated through an angle determined by pins 57 and 58. Immediately beneath each beam 12, 14 and 16 is a cam 62, 64 and 66, the major diameter of which bears a fixed relation to the arms on the shaft so that when the arms are thrown upwardly, the high point of the cam is carried beneath the beam and raises the beam off its bearing on the stirrup 24. A latch is also provided for each shaft in order that the handle 50, 52, 54, 56 may be held in lifted position. Each shaft also has fixed thereon a strike plate 70, 72, 74 and 76 adapted to be engaged, respectively, by a latch 80, 82, 84 and 86 pivoted, say, on some convenient part of the plate 38, as at 86', a stop 88 limiting counterclockwise movement of the latch under the influence of a compression spring 89 bearing on the respective latches.

The latches are released by being tripped in one manner or another. For instance, latch 80 is shown as tripped to release the strike plate 70 by a counter-weighted pivoted detent 90 carried upon a vertically movable arm 91 actuated by a solenoid 92 against the action of the spring 93. Latch 82 is shown as caused to release the strike plate 72 by a solenoid 81 to the core 94 of which it is pivotally connected. Latches 84 and 86 are shown as released by counter-weighted tripping pawls 96 and 98, respectively, actuated by the respective solenoids 95, 97. Also mounted on each shaft is shown a mercury switch 100, 102, 104 and 106 whereof each end of the elongated envelope contains a pair of spaced contacts, indicated at 107, 108; 109, 110; 111, 112; and 113, 114. The mercury switches are so positioned on the respective shafts that when the arms 50, 52, 54 and 56 are in uppermost position, as illustrated by the arms 50, 54 and 56, the odd numbered pairs of contacts 107, 109, 111 and 113 are uppermost, whereas when the arms or handles are in a downward or lowermost position, as illustrated by the handle 52, the even numbered contacts 108, 110, 112 and 114 are in the uppermost position. Obviously, when the contacts are in the lowermost position, the mercury in an envelope has moved to that low part of the tube and has established an electrical connection between the two contacts of a pair.

Figure 4:
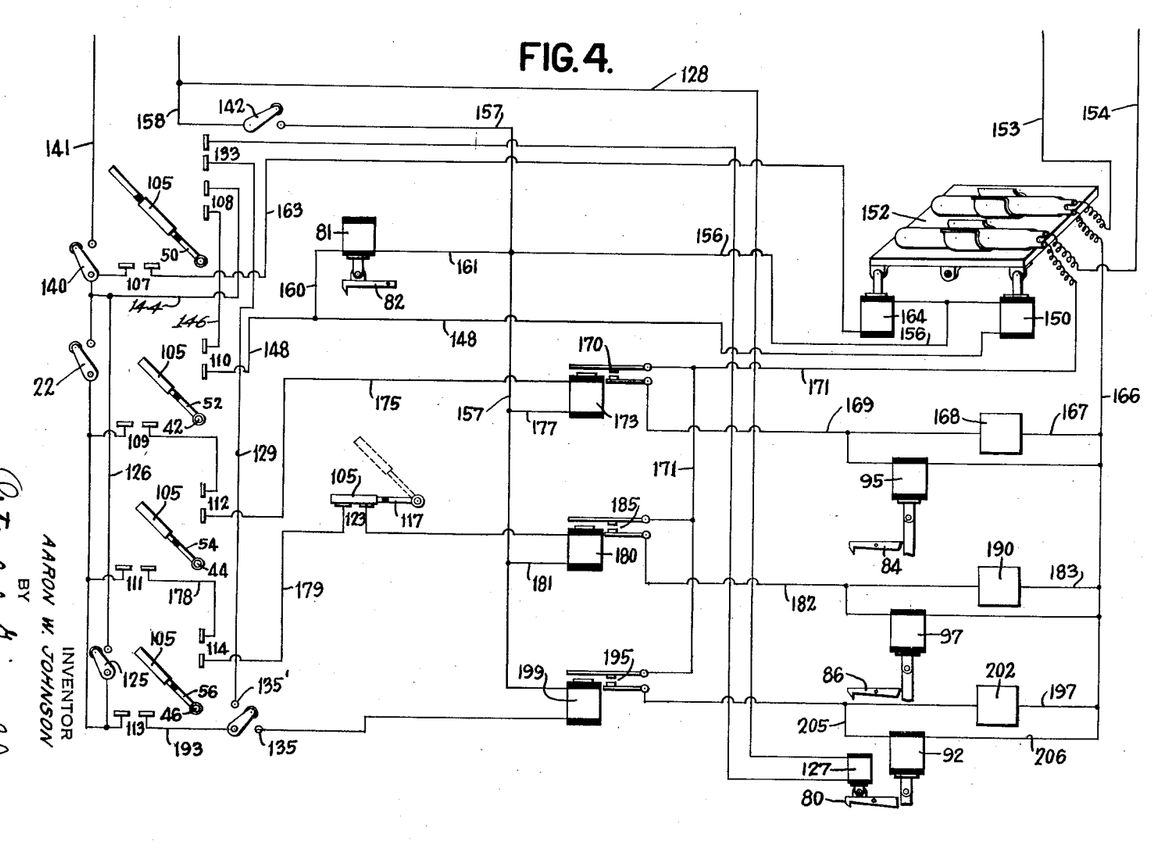
Figure 4 is a wiring diagram showing the energization of motor means which actuates the controlling means for the several beams.

In the wiring diagram of Figure 4, spaced contacts 107, 108, 109, 110, 111, 112, 113 and 114 are illustrated as adapted to be closed by a bridging member 105 which may be considered the equivalent of mercury. This bridging member is pivoted and is movable from a lowermost position corresponding to the position assumed by the handle 52 in Figure 1 at which time the contact 107 is bridged, as by mercury, to a vertical position as indicated by the position assumed by the handle 50 in Figure 1 when the contacts 108 are bridged. The arms on which the contacts are mounted are given, in this figure, the reference character corresponding to the handle of the appropriate mercury switch.

Figure 2:
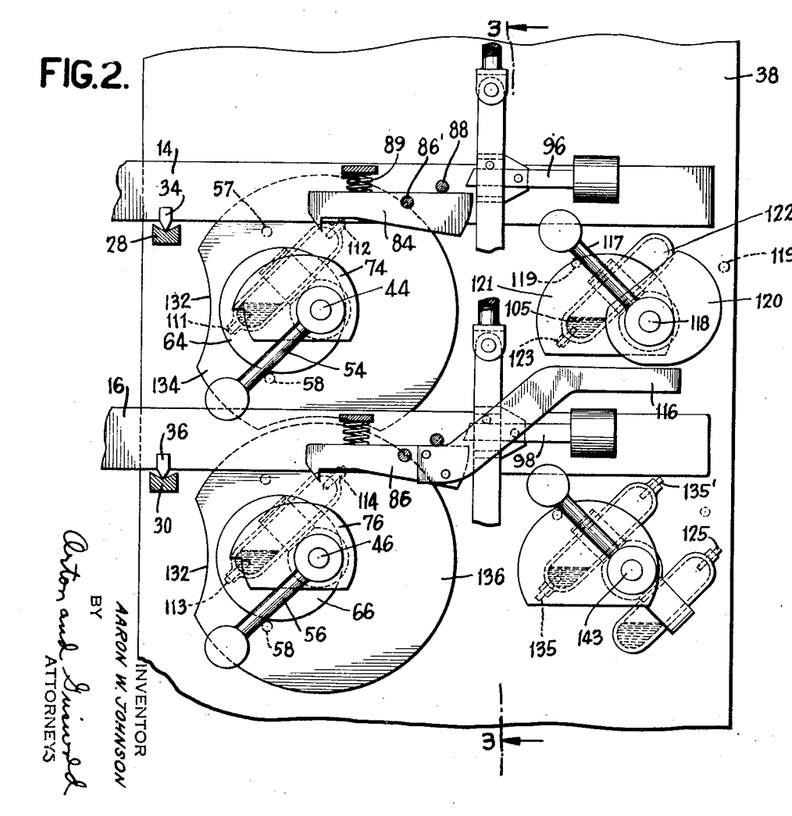
Figure 2 is a view showing the latching means for selected scale beams with provision for rendering such beam or beams inoperative as desired.

A modification of the invention is illustrated in Figure 2 wherein it is possible, manually, to render inoperative a scale beam irrespective of the operation of the apparatus in its usual cycle. To this end, a latch, which in this instance is taken as the latch 86, as illustrative of its application to any of the latches, is provided with an extension 116 which extends in the opposite direction from the operative end of the latch 86 so that said latch may be maintained in an elevated or inoperative position whenever the end 116 is depressed. Immediately above the end 116 and rotatably mounted in the plates 38, for instance, is illustrated a shaft 118 having a counter-weighted arm 117 mounted on the extension of the shaft forwardly of the front plate 38 and movable between two positions defined by pins 119. This shaft carries the cam 120 by which the end of the arm 116 is depressed and also carries a mercury switch in the form of an elongated envelope 122 having a pair of contacts 123 in its end. When the counter-weighted arm 117 is disposed at its extreme left position, as illustrated in Figure 2, the cam 120 is out of contact with the arm 116, but when the counter-weighted arm is thrown to the opposite position, the cam 120 is brought into engagement with and depresses the arm 116, thereby holding the latch 86 out of engageable position with the strike plate, say, that indicated at 76.

As mentioned before, the upper latch 70, 80 is not provided with a cam to effect contact with the beam 16 and hence can be located anywhere.

Figure 1:
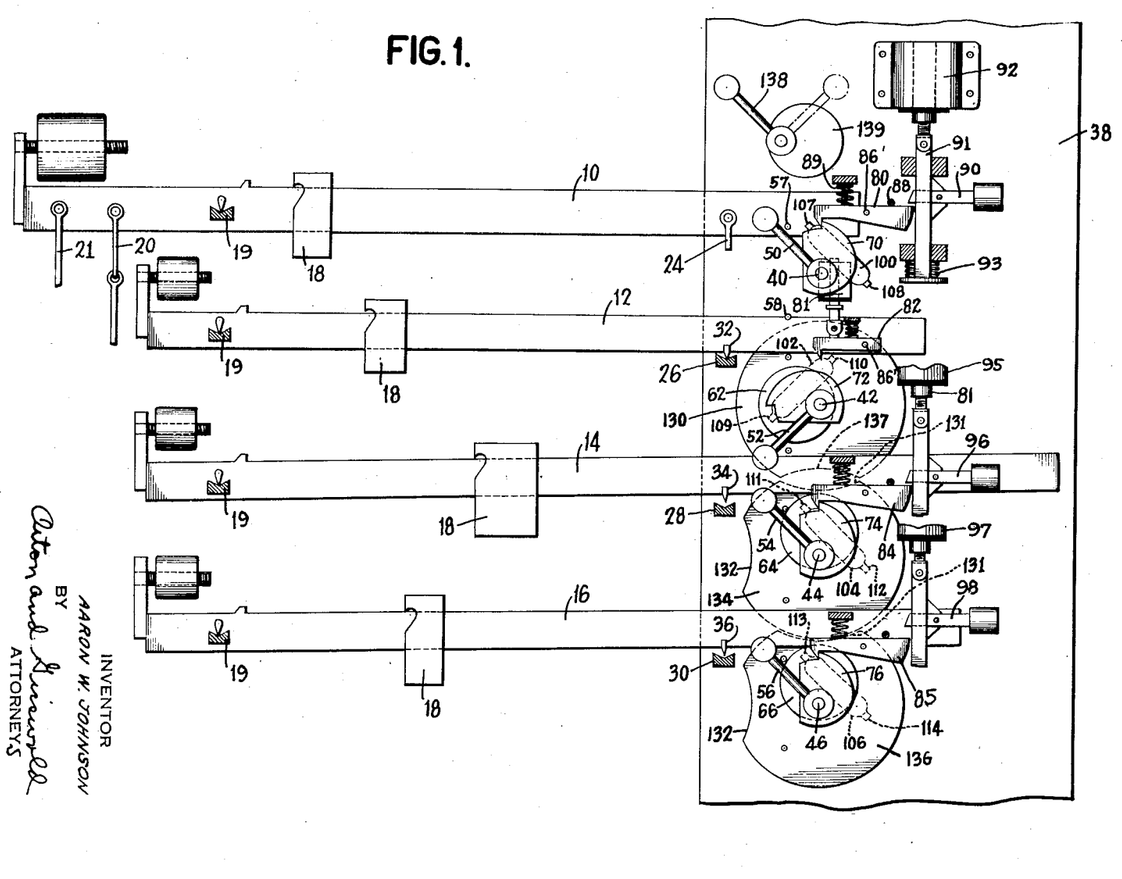
Figure 1 is a view showing a series of scale beams having provision for controlling the independent and united action thereof.

To insure the sequential operation of the beams 12, 14 and 16, there is provided, in the illustrated embodiment, interengaging members upon the respective shafts 42, 44 and 46. These are shown as taking the form of mutilated discs. The disc 136 on the shaft 46 has its periphery cut away at two places, as indicated at 131 and 132, the portion cut away being preferably defined by an arc of a radius equal to the diameter of the disc with which it engages. Similarly, the disc 134 on the shaft 44 is provided with similar cut away portions 131 and 132. Disc 130 is shown as provided with only one cut away portion, indicated at 137, since it cooperates only with the disc immediately therebelow. This cut away portion is also similar to the cut away portion of the other discs 134 and 136. When all three beams 12, 14 and 16 are latched in elevated, i. e., inoperative or neutral position, the arms or handles 52, 54 and 56 are in elevated position. At this time, the recess 137 in the disc 136 is disposed to the left of the shaft 42 and occupies the place assumed by the cut away portion 132 of disc 134 in Figure 1. The disc 130 may assume this position because it enters the recess 131 in the disc 134 which in turn may assume the position illustrated in Figure 1, since a portion of its periphery enters the recess 131 in the disc 136. It is not possible to start the weighing operation until all three handles 52, 54 and 56 are in the raised position, thus latching the beams 12, 14 and 16 off the bearings 26, 28 and 30. It is also obviously impossible to raise any one of the handles until the handles and latches of those below it are in the raised position. Thus when the handle 52 is in its uppermost position, the disc 130 is within the recess 131 of disc 134 and handle 54 can not be moved downwardly because the shaft 44 cannot be rotated, the recess 131 in the disc 134 preventing this movement since disc 130 is therein. When however, the handle 52 is in lowermost position corresponding to the assumed position shown in Figure 1, the recess 137 is in lowermost position and will permit disc 134 to be rotated in a clockwise position so that the handle 54 can be moved to its uppermost position, as shown in Figure 1. At this time, of course, the disc 134 is free to rotate since the recess 131 in the disc 130 is in position to permit it to rotate. When the handle 54 moves to its lowermost position and disc 134 is correspondingly rotated, the recess 132 assumes the position shown for the recess 137, thereby permitting the disc 136 to rotate and the handle 54 to be moved to lowermost position. If there are no beams beneath the beam 16, the recess 132 in the disc 136 has no function and may be omitted.

The operation of this invention in automatic batch weighing will be understood by referring to the wiring diagram of Figure 4. First, of course, a manual switch 140 is closed in the control line 141 from the source of current and also a hopper gate operated limit switch 142, as will be understood. It must also be borne in mind that the latch 70, 80 controlling the arm 50 has no operative relation to the tare beam 10. Switches 140 and 100 are merely shown in Figure 1 in convenient position for actuation. The handle 50 is then raised and latched in position by latch 80 for the purpose of completing the circuit through the various mechanisms in the first weighing step. The other handles 52, 54 and 56 are also in raised position at this time. The movement of handle 50 tips the mercury switch to the right as shown in Figure 1 so that the mercury completes the circuit between the spaced contacts 108.

Current then flows from the line 141 through closed switch 140 and lead 144 to the contacts 108 completed by the mercury in the mercury switch and then through a lead 146 to the contacts 110 which are electrically connected by reason of the fact that the handle 52 is in elevated or latched position and the capacity beam 12 out of operative position. Current then flows from contacts 110 through the line 148 to solenoid 150 which serves to tip the line starting or completing switch 152 in a clockwise direction, as viewed, to complete the circuit through the power line 153, 154, as will be hereinafter described. The circuit from the electromagnet 150 is completed through the leads 156, 157, hopper switch 142 to the control line 158. At the same time, the solenoid 81 is energized by current flowing from lead 148 through the lead 160, 161 to the lead 157, which immediately trips the latch 82 and permits the arm 52 to fall and interrupting the circuit thus formed while the contacts 109 are connected. This movement rotates the cam 62 from beneath the first capacity beam 12 and allows the beam to rest on the stirrup fulcrum 26. So soon as this weight is on the tare beam, the weighing switch 22 actuated by the beam rod 21 is closed and the current then passes through the contacts 109 and through the closed contacts 112 of the mercury switch operated by the handle 54 (which is in raised position) and then to a relay 173 which controls the electrically energized device 168 for effecting feeding of the first ingredient. Such electrically energized devices are well known in the art. The circuit which includes the contacts 112 and the relay 173 comprises a lead 175 and a lead 177 completing the circuit with the line 157 to the control line 158. Energization of the relay 173 closes the contacts 170 and energizes the line 169 forming part of the power line circuit 153, 166 and 154. In this circuit is a power feeder or valve 168 of any kind for feeding the first ingredient. A release solenoid 95 is in parallel either with the relay 173 of the control line 175, 177 or with the feeding device 168 of the feeding circuit. In Figure 4, the release solenoid 95 is illustrated as in parallel with the power line or feeding circuit therefor. When the feeding of the ingredient commences, this solenoid plunger is raised, thereby cocking the trip for the latch 84. This latch 84 remains cocked until the proper amount of material is placed in the hopper. When the beam rises, the circuit is broken by the opening of the weighing switch 22. This permits the plunger on the solenoid 95 to fall, tripping the latch 84 and permitting the handle 54 to fall to its lowermost position, thus completing the circuit through the contacts 111.

Again the weight of beam 14 on the tare beam closes the weighing switch 22. The circuit is now established through the weighing switch 22 to the left hand side of the tube 104 and through the contacts 111 which are closed because the handle 54 is in lowermost position, through the lead 178 to and through the closed contacts 114 and lead 179 to the relay 180 which is also in circuit with the line 157 by lead 181, which relay 180 closes the contacts 185 in the power line circuit 153, 171, 182, 183, 166 including the power feeder or valve 190. At the same time, the solenoid 97 in parallel with valve 190 is energized to cock the trip 98 on the latch 86, which remains cocked until the required amount of ingredient is placed in the hopper. As before, when the beam 10 rises, the circuit is broken by the opening of the weighing switch 22. This deenergizes the solenoid 97 permitting the plunger to fall, tripping the latch 86 and permitting the handle 56 to fall to its lowermost position.

The weight of the capacity beam 16, thus released, on the tare beam again closes the weighing switch 22 and completes the circuit through contacts 113, lead 193, relay 199 and lead 194 to the line 157. The relay 199, thus energized, closes the contacts 195 and thus completes the power line circuit including leads 196, 197, and the power feeder or valve 202. At the same time, the parallel circuit 205, 106 is energized. This circuit may include cocking devices for the latch of another capacity beam. As shown, however, since only three capacity beams are illustrated, the solenoid 92 therein, when the final ingredient is weighed, upon energization, cocks the trip 90 for the latch 80 controlling the switch 100 which releases the handle 50 closing the contacts 107. The circuit is now completed from the control line 141 through contacts 107 and a lead 163 to a solenoid 164 (and thence, of course, through leads 156, 157 to the line 158), which tips the line starting switch 152 in the opposite direction and opens the power line circuit 153, 154.

The foregoing description covers the automatic weighing with all beams set for a different ingredient. These ingredients need not go into a common hopper, but each ingredient can go into a separate hopper so long as all hoppers are connected to the same lever system.

Figure 2 illustrates a by-pass latch, which may be used to permit complete disengagement of one or more capacity beams, so that it is or they are rendered inoperative entirely, yet not so as to interrupt a complete cycle containing the other beams. This latch contains a separate mercury tube or other switch.

Assume, as shown in Figures 2 and 4, that the second capacity beam 14 is to be rendered inoperative. Beam 14 would normally control weighing when latch handle 54 was in its down position and latch handle 56 in its up position, as has been explained. To render beam 14 inoperative, the latch 86 normally holding cam 66 in operative position is disengaged in a manner permanent for this type of weighing, in the following manner: Latch 86 is provided with a rearward extension 116. Immediately above extension 116 and conveniently journalled in the same plate 38 is a shaft 118 carrying a cam 120 of a shape and in a position to engage and depress the extension 116 sufficiently to release latch 85 and let handle 56 fall and a cam 121 so shaped as to engage beam 14 and hold it off its bearing 28 even though handle 54 is in down position. Shaft 118 also has an operating handle 117, the movement of which is limited by stops 119, 119'. When the handle 117 engages stop 119, the latch is inoperative and beam 14 operative and when handle 117 engages stop 119', the cams 120, 121 are in operative positions throwing beam 14 out of operation and releasing latch 86. Also carried on the shaft 118 is the tubular envelope 122 of a mercury switch containing at one end spaced contacts 123.

Referring now to the circuit diagram of Figure 4, it will be noted that when the circuit through contacts 123 in line 179 is completed, which is when the by-pass device is inoperative, the circuit operates as described for Figure 1. When, however, the by-pass device is operative, the circuit is opened through the contacts 123 and the hopper gate actuator 190 inoperative. After beam 12 and its associated mechanism has completed its movement in weighing one batch of material, it will be recalled, the circuit is broken by the opening of the weighing switch 22. This has permitted the plunger of solenoid 95 to fall tripping latch 84 and permitting the handle 54 to fall to its lowermost position and completing the circuit through the contacts 111, handle 56 being raised and contacts 114 closed. However, cam 121 keeps beam 14 from assuming its position on the bearing 28. Also the entire circuit including the contacts 114 is open so that gate 190 is not opened. When arm 54 falls, locking cam 132 is in position to free disc 136 for movement and arm 56 can then fall to close contacts 113. Contacts 113 being closed, because latch 85, 116 has disengaged arm 56 and permitted it to fall, relay 199 is energized, closing contacts 195 which energizes gate actuating device 202 and solenoid 92, which functions to weigh the last ingredient by the capacity beam 16, followed by the release of the latch 80 which results in the neutralizing of the apparatus as explained before.

An entirely different circuit is necessary when, and only when, the last capacity beam 16 is to be rendered inoperative. In that case, the feeder circuit must also be opened so that valve 202 will not operate and in addition, the solenoid 92 caused to actuate latch 80 to raise it and release arm 50 when latch arm 56 reaches lower position. In this situation, the feeder circuit is opened as indicated in Figure 4 by a switch 125 in a lead 126 which may connect with the line 141 between the manual switch 140 on the tare beam and the weighing switch 22 on the beam rod 21 and connect with one of the spaced contacts 113. This enables current to flow to contacts 113 regardless of the position of the beam 16. Simultaneously with the opening of switch 125 and as the latch handle 56 reaches lowermost position to effect closing of contacts 113, a solenoid 127 is energized to raise latch 80 to release the arm 50 and close the circuit energizing the solenoid 164 to open the power line, as has been explained. Also in the line between contacts 113 and the relay operating the switch handle 50 which opens the entire circuit at the completion of an entire weighing operation, is a switch 135, 135'. Solenoid 127 is energized by a line 128 which may be connected with the control line 158 and a lead 129 to the other contact of switch 113, a switch 133 controlling the current in this line 129. The switches 125 and 135 may be considered as spaced pairs of contacts in a tubular envelope containing mercury which mercury switch is on a rotatable by-pass shaft such as the shaft 118 whereby one pair of contacts is closed when the others are open. The single circuit switch 133 may be actuated by the cam shaft 40 so disposed as to be closed in up position of the handle 50 and open in down position thereof.

Figures 5, 6:
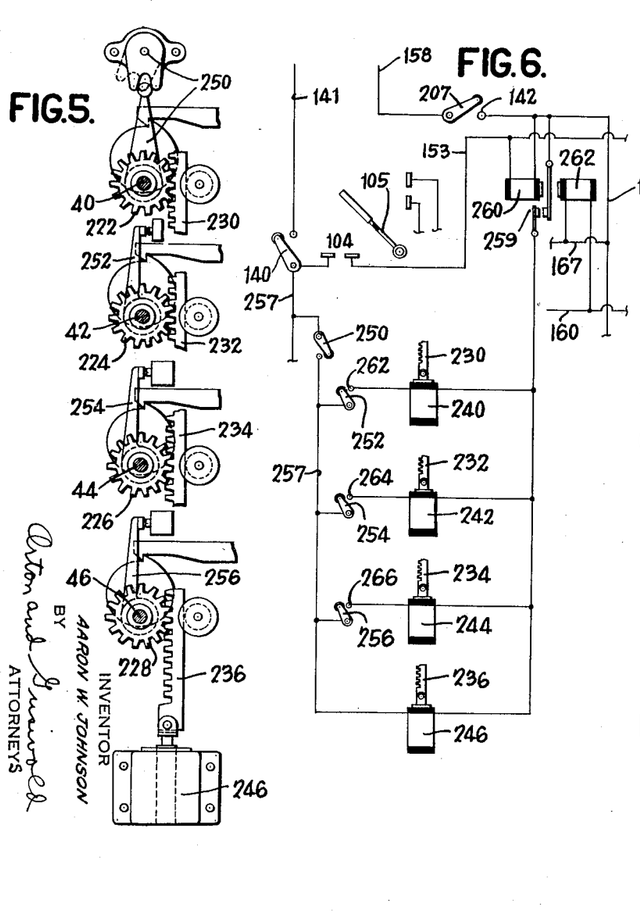
Figure 5 is a fragmentary view showing instrumentalities for the cyclic resetting of the several scale beams.
Figure 6 is a wiring diagram of the instrumentalities whereby fully automatic sequence weighing is effected.

The capacity beams may be reset, i. e. raised off their fulcrums 26, 28, 30 respectively, manually or mechanically. To accomplish this manually, the handles 50, 52, 54 and 56 may be raised by hand. It may be automatically accomplished by a fully automatic cycle of batch weighing and resetting as shown in Figures 5 and 6. The shafts 40, 42, 44 and 46 may carry pinions 222, 224, 226 and 228, respectively. In mesh with these pinions are racks 230, 232, 234 and 236 respectively connected with the cores of the respective solenoids 240, 242, 244 and 246. Also fixed on the shafts 40, 42, 44 and 46, respectively, are switch arms 250, 252, 254 and 256. The arm 250 actuates a switch in the line 257 connected with the control line 141. The solenoids 240, 242, 244 and 246 are in parallel between the line 257 and a lead 258 in circuit with the power line 158. This circuit is interrupted by relay controlled contacts 259. The solenoids 240, 242, 244 are respectively controlled by switches 262, 264 and 266 respectively actuated by the arms 252, 254, and 256.

Contacts 259 are closed wherever the relay 260 is energized. This relay 260 in electrical connection on the one hand with the lead 148 through which current passes whenever handle 50 is down and contacts 104 connected, and on the other hand with the power line lead 157. The contacts 259 are opened by a relay 262 in parallel with solenoid 81.

When latch handle 50 is in down position the reset circuit is closed because relay 260 is energized. Solenoid 246 is also energized moving rack 236 and the pinion 228 with which it engages. The shaft 46 is thus rotated to move the cam 66 under the last capacity beam 16 to raise it off its bearing 30. Rotation of shaft 46 also brings switch arm 256 into switch closing position at the end of the shaft's movement. The beam 16 having been elevated, the closing of switch 266 energizes solenoid 244 effecting a similar setting of beam 14 with the subsequent closing of the switch 264 and energization of solenoid 242 which returns shaft 44 to initial position and raises beam 14 off its bearing 26. Again the switch 262 is closed energizing the solenoid 240 which effects rotation of the shaft 40 until the handle 50 is latched in elevated position and switch 250 opened to deenergize all the solenoids 240, 242, 244 and 246. Raising the handle 50, of course, also interrupts the circuit through relay 260. With the latch handle 50 and 52 in elevated position, of course, the relay 262 is also energized which acts to positively open the contacts 259. The resetting circuit just described is again reestablished when latch arm D assumed a down position, which is only assumed after another cycle of weighing.

Figure 7:
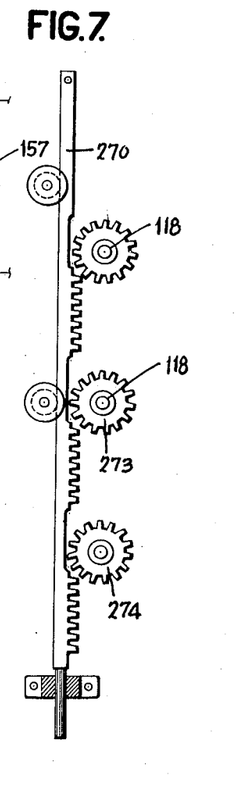
Figures 7 and 8 are views in side and front elevation, respectively, showing manual means for effecting selective automatic sequence weighing.
Figure 8:
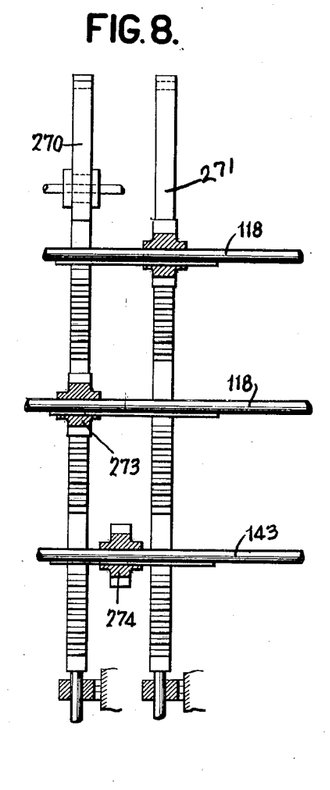

In Figures 7 and 8 there are shown mechanical devices to effect selective batching. One or more so-called rack strips are used, one for each combination desired. Two such racks are illustrated at 270 and 271. The gears 273, 274 interengaging with these racks are shown as slidable on extensions of the by-pass latch shafts, such as the shaft 118, but, keyed against rotation. In normal operation, the rack strips would be in the lower position shown, completely disengaged from any gears. By sliding the gears in and out of the line of mesh on these rack strips, different setting can be obtained, as will be understood. Operating mechanism to effect setting and actuation is not shown, it being obvious that the gears may be arranged to slide in and out of engagement by means of fingers and more than one gear may be placed on a shaft with the sliding fingers so placed as to permit engagement of any single shaft with any one or more of the rack strips. These rack strips may, of course, be operated by hand or by direct pull solenoid or by any other means, permitting fully electric operation from a remote point if desired.

It will thus be seen that a system of automatic weighing is provided in which there is an entire absence of delicately balanced electrical circuits, or, any fragile apparatus of any sort and in which a mechanical-electrical interlock is provided which makes doubly certain that the proper cycle is followed. The advantage of the multiple beam system is that all weighing is controlled by the position of the tare beam, making for the simplest and most accurate system. While, normally, there is an "overrun" in all automatic weighing due to the "drop" from the discharge point to the top of the material in the hopper, a separate beam switch may be used, permitting the cut-off to occur with the beam below balance position and yet the restarting of the cycle may occur when the beam returns to balance position.

Various modifications will occur to those skilled in the art in the configuration and disposition of the component elements going to make up the invention as a whole as well as in the selection of various features in a scale or the substantial mechanically equivalent instrumentalities to accomplish results sought and no limitation is intended by the phaseology of the foregoing description or illustrations in the accompanying drawings except as indicated in the appended claims.

What is claimed is:

1. A batch weighing scale comprising a plurality of scale beams, means to control the respective beams, electrically released gravity actuated means to automatically render said control means inoperative in sequence for automatic sequence weighing.

2. A batch weighing scale comprising a plurality of scale beams, means to control the respective beams, electrically released gravity actuated means to automatically render said control means inoperative in sequence for automatic sequence weighing and means to reset the respective beams.

3. The combination with a control device such as a hopper gate actuating device, of a plurality of scale beams, means to control the respective beams, electrically released gravity actuated means to automatically render said control means inoperative in sequence for automatic sequence weighing and automatic means operable only upon completion of said sequence weighing to actuate said hopper gate actuating device.

4. In a batch weighing scale comprising a tare beam, a plurality of capacity beams, a plurality of power means for load delivery means, a power means circuit, means to selectively connect said power circuit with a predetermined power means, electrically released gravity actuated means to selectively add the weight of a capacity beam to the tare beam including an electrical circuit comprising means dependent on the operation of the adding means to complete the circuit, electrically responsive means to actuate the adding means of a successive capacity beam, and a relay closing a circuit with the power means circuit and a power means.

5. In a batch weighing scale comprising a tare beam, a plurality of capacity beams, a plurality of power means for load delivery means, a power means circuit, means to selectively connect said power circuit with a predetermined power means, electrically released gravity actuated means to selectively add the weight of a capacity beam to the tare beam including an electrical circuit comprising means dependent on the operation of the adding means to complete the circuit, electrically responsive means to actuate the adding means of a successive capacity beam, a relay closing a circuit with the power means circuit and a power means and means to deenergize the circuit upon completion of weighing of the last ingedient.

6. In a batch weighing scale comprising a tare beam, a plurality of capacity beams, a plurality of power means for load delivery means, a power means circuit, circuit closing means to selectively connect said power means circuit with a predetermined power means, cam means to remove the weight of a capacity beam from the tare beam and movable to selectively add the weight of said capacity beam to the tare beam, an electrical circuit comprising circuit closing means operable with the cam means, electrically responsive means to restrain the cam means and to release the cam means of a successive capacity beam and a relay for the first named circuit closing means and a power means.

7. In a batch weighing scale comprising a tare beam, a plurality of capacity beams, a plurality of power means for load delivery means, a power means circuit, circuit closing means to selectively connect said power means circuit with a predetermined power means, cam means to remove the weight of a capacity beam from the tare beam and movable to selectively add the weight of said capacity beam to the tare beam, an electrical circuit comprising circuit closing means operable with the cam means, electrically responsive means to restrain the cam means and to release the cam means of a successive capacity beam and a relay for the first named circuit closing means and a power means and means to deenergize the circuit upon completion of weighing the last ingredient.

8. In a batch weighing scale comprising a tare beam, a plurality of capacity beams, a plurality of power means for load delivery means, a power circuit, electrically actuated means to selectively connect said power circuit with a power source, means to selectively add the weight of a capacity beam to the tare beam including an electrical circuit comprising means dependent on the operation of the adding means to complete the circuit, electrically responsive means to actuate the adding means of a successive capacity beam and a relay closing a circuit with the source of power means and a power means.

9. In a batch weighing scale comprising a tare beam, a plurality of capacity beams, a plurality of power means for load delivery means, a power circuit, electrically actuated means to selectively connect said power circuit with a power source, means to selectively add the weight on a capacity beam to the tare beam including an electrical circuit comprising means dependent on the operation of the adding means to complete the circuit, electrically responsive means to actuate the adding means of a successive capacity beam, a relay closing a circuit with the source of power and a power means and means to deenergize the circuit upon completion of weighing the last ingredient.

10. In a batch weighing scale comprising a tare beam, a plurality of capacity beams, a plurality of power means for load delivery means, a power circuit, electrically actuated means to selectively connect said power circuit with a power source, means to selectively add the weight on a capacity beam to the tare beam including an electrical circuit comprising means dependent on the operation of the adding means to complete the circuit, electrically responsive means to actuate the adding means of a successive capacity beam, a relay closing a circuit with the source of power means and a power means and means to by-pass a selected circuit.

11. A batch weighing scale comprising a tare beam, a plurality of capacity beams, a corresponding number of delivery power means, a rotatable shaft proximate each capacity beam, means movable with each shaft to control the operativeness of a capacity beam and a corresponding delivery power means and means to operate each shaft comprising motor means for each shaft and a circuit closer for each motor means actuated by the succeeding shaft to reset said capacity beams seriatim preparatory to a subsequent weighing operation.

12. A batch weighing scale comprising a tare beam, a plurality of capacity beams, means to deliver ingredients corresponding to each capacity beam, and means to selectively render inoperable at least one capacity beam and a corresponding delivery means comprising a by-pass circuit, said means comprising a plurality of racks, a shaft for each capacity beam to be by-passed and a pinion slidable thereon into and out of engagement with a rack.

13. In a batch weighing scale comprising a tare beam, at least one capacity beam, at least one power means for load delivery means, a power means circuit, means to selectively connect said power means circuit with a predetermined power means, gravity actuated means to selectively add the weight of a capacity beam to the tare beam including an electrical circuit comprising means dependent on the operation of the adding means to complete the circuit, electrically responsive means to actuate the adding means of a successive capacity beam, a relay closing the power means circuit to energize the power means for the load delivery means.

14. In a weighing scale, the combination with a scale beam having a knife edge and a fulcrum therefor, of means to lift said scale beam and knife edge off the fulcrum comprising a rotatable shaft disposed transversely of the scale beam, means to turn the shaft, a cam fixed on the shaft and having a portion adapted to engage the beam and raise it off the fulcrum, a strike plate carried with the shaft, a latch pivoted independently of the shaft and adapted to engage and retain the strike plate in one position of the cam, a switch actuated by movement of the shaft, a solenoid adapted to trip the latch and a mutilated disc carried with the shaft adapted to be engaged by a companion disc on another shaft to control movement of the shaft.

15. In a weighing scale, the combination with a plurality of scale beams having, respectively, a knife edge and a fulcrum therefor, of means to lift said scale beams and knife edges off the fulcrums, respectively, comprising rotatable shafts disposed, respectively, transversely of and below the scale beams, handles carried by the shafts to turn the same, cams fixed on the shafts and having a portion, respectively, adapted to engage the beam and raise it off the fulcrum, strike plates carried with the shaft, respectively, latches pivoted independently of the shafts and adapted to engage and retain the respective strike plates in one position of the cams, switches actuated by movement of the shafts respectively and mutilated discs carried with the respective shafts adapted to interengage to control movement of the shafts.

16. In a weighing scale, the combination with scale beams arranged substantially one above the other and each having a knife edge and a fulcrum therefor, of means to lift each scale beam and knife edge off its fulcrum comprising a rotatable shaft disposed transversely of the scale beam, a counterweight on each shaft to turn the same, a cam fixed on the respective shafts each having a portion adapted to engage a beam and raise it off its fulcrum, a strike plate carried with each shaft, a latch pivoted independently of the shaft and adapted to engage and retain the strike plate in one position of the cam, a switch closed at one position of the shaft, automatic means to trip the latch, and a mutilated disc carried with each shaft adapted to be engaged by an unmutilated portion of a companion disc on another shaft to prevent movement of a succeeding shaft until the preceding shaft has been moved.

17. In a weighing scale, the combination with a plurality of scale beams each having a knife edge and a fulcrum therefor, of means to lift said scale beams and knife edges off the fulcrums, respectively, comprising a rotatable shaft disposed transversely of and below each scale beam, a counterweighted handle carried on each shaft to turn the same, a cam fixed on each shaft and having a portion adapted to engage the beam and raise it off the fulcrum, a strike plate carried with the shaft, a latch pivoted independently of the shaft and adapted to engage and retain the strike plate in one position of the cam, a switch closed by movement of each shaft, means to trip the latch, a circular disc carried with each shaft, the disc on the uppermost shaft being formed in its periphery with a portion cut away on an arc of a radius equal to the radius of the disc on the shaft below, the periphery of the disc below entering the cut away portion of the disc on the shaft above to control movement of a shaft.

18. In a weighing scale, the combination with a plurality of scale beams each having a knife edge and a fulcrum therefor, of means to lift said scale beams and knife edges off the fulcrums, respectively, comprising a rotatable shaft disposed transversely of and below each scale beam, a counterweighted handle carried on each shaft to turn the same, a cam fixed on each shaft and having a portion adapted to engage the beam and raise it off the fulcrum, a strike plate carried with the shaft, a latch pivoted independently of the shaft and adapted to engage and retain the strike plate in one position of the cam, a switch closed by movement of each shaft, means to trip the latch, a circular disc carried with each shaft, the disc on the uppermost shaft being formed in its periphery with a portion cut away on an arc of a radius equal to the radius of the disc on the shaft below, the periphery of the disc below entering the cut away portion of the disc on the shaft above, the disc on the said disc below being formed in its periphery with two portions each cut away on an arc of a radius equal to the radius of the disc above, the periphery of the disc above entering the cut away portion of the disc on the shaft below to control movement of a shaft.

19. In a weighing scale, the combination with a scale beam having a knife edge and a fulcrum therefor, of means to lift said scale beam and knife edge off the fulcrum comprising a rotatable shaft disposed transversely of and below the scale beam, a counterweighted handle carried at the front end of the shaft to turn the same, a cam fixed on the shaft and having a portion adapted to engage the beam and raise it off the fulcrum, a strike plate carried with the shaft, a latch pivoted independently of the shaft and adapted to engage and retain the strike plate in one position of the cam, spring means urging the latch into engagement with the strike plate, a stop limiting movement of the latch, a switch comprising a tubular envelope having spaced contacts at each end containing mercury carried with the shaft, a solenoid adapted to trip the latch and a mutilated disc carried with the shaft adapted to be engaged by a companion disc on another shaft to control movement of the shaft.

20. A batch weighing scale comprising a plurality of scale beams, means to render the scale beams inoperative, respectively, counterweighted means to render said first named means inoperative to release the scale beams for movement, respectively, said respective last named means being interconnected whereby a first named means of a subsequent scale beam is restrained from operation until the preceding first means in the series has released the scale beam it controls for movement.

21. A batch weighing scale comprising a plurality of scale beams, a shaft in operative relation with each beam, means carried with the shafts to render the respective scale beams inoperative, interengaging discs carried with the respective shafts and operative to disengage a succeeding shaft to permit operation of the corresponding beam only when the preceding shaft has been operated for a weighing operation.

22. A batch weighing scale comprising a tare beam, a plurality of capacity beams, a corresponding number of delivery control means, a rotatable shaft proximate certain of said beams, means movable with each shaft to control the operativeness of the beam and a corresponding delivery control means and means to operate each shaft comprising a pinion on the shaft, a rack and motor means to actuate said rack and a circuit closer for each motor means and means to energize the motor means simultaneously.

23. In a batch weighing scale, in combination, a tare beam, a capacity beam, means carried with the tare beam to receive the weight of the capacity beam, a power line circuit comprising a power line completing switch, an electrically actuated ingredient feeding means, relay controlled contacts and a latch actuating electromagnet, a second circuit comprising an electromagnet to close the power line completing switch, a manually actuated second switch, a latch actuating electromagnet and a third switch open when the tare beam is relieved of load, a latch holding the second switch closed and controlled by the first named electromagnet in the power line circuit, a third circuit comprising a fourth switch which circuit is completed when the weight of the capacity beam is received by the tare beam and a relay of said relay controlled contacts of the power line circuit and a fourth circuit comprising an electromagnet and a manually actuated switch to open the power line completing switch.

24. In a weighing scale, the combination with a scale beam having a knife edge and a fulcrum therefor, of means to lift said scale beam and knife edge off the fulcrum comprising a rotatable shaft disposed transversely of and below the scale beam, cam means on the shaft having a portion adapted to engage the beam and raise it off the fulcrum, a strike plate carried with the shaft, a latch pivoted independently of the shaft and adapted to engage and retain the strike plate in one position of the cam, a solenoid adapted to trip the latch, a pinion carried with the shaft, a rack in mesh with the pinion, a motor means to reciprocate the rack to return the shaft to position to raise the beam off its fulcrum.

25. In a weighing scale, the combination with a scale beam having a knife edge and a fulcrum therefor, of means to lift said scale beam and knife edge off the fulcrum comprising a rotatable shaft disposed transversely of the scale beam, cam means on the shaft having a portion adapted to engage the beam and raise it off the fulcrum, a strike plate carried with the shaft, a latch pivoted independently of the shaft and adapted to engage and retain the strike plate in one position of the cam, motor means adapted to trip the latch, motor means to return the shaft to position to raise the beam off its fulcrum.

26. In a batch weighing scale comprising a tare beam, at least one capacity beam, at least one power means for load delivery means, a power means circuit, means to connect said power means circuit with a power means, gravity actuated means to add the weight of the capacity beam to the tare beam including a second electrical circuit comprising means dependent on the operation of the adding means to complete the said second circuit and a relay closing the power means circuit to energize the power means for the load delivery means.

27. In a batch weighing scale comprising a tare beam, a plurality of capacity beams, a plurality of power means for load delivery means, a power means circuit, circuit closing means to selectively connect said power means circuit with a predetermined power means, cam means to remove the weight of a capacity beam from the tare beam and movable to selectively add the weight of said capacity beam to the tare beam, an electrical circuit comprising circuit closing means operable with the cam means, electrically responsive means to restrain the cam means and to release the cam means of a successive capacity beam, a relay for the first named circuit closing means and a power means, additional cam means to render a capacity beam unresponsive to said first named cam means, electrical means operable with said additional cam means to render inoperative power means for said capacity beam, means operable with said additional cam means to mechanically release latch restraining the first named cam means of the succeeding capacity beam and interengaging means between the first named cam means to control the operation thereof.

28. A batch weighing scale comprising a tare beam, a plurality of capacity beams, means to deliver ingredients corresponding to each capacity beam, and means to selectively render inoperable at least one capacity beam and a corresponding delivery means comprising a by-pass circuit, said means comprising a plurality of racks, a shaft for each capacity beam to be by-passed and a pinion slidable thereon into and out of engagement with the rack means.

29. A batch weighing scale comprising a tare beam, a plurality of capacity beams, a corresponding number of delivery power means, a rotatable shaft proximate each beam, means movable with each shaft to control the operativeness of the beam and a corresponding delivery power means and means to operate each shaft comprising a pinion on the shaft, a rack and motor means to actuate said rack, a circuit closer for each motor means actuated by the preceding shaft and means to reenstate the sequential operation of said shafts after the last power means has completed its operation in the preceding sequential operation.

30. A batch weighing scale comprising a tare beam, a plurality of capacity beams, a corresponding number of delivery power means, a rotatable shaft proximate each beam, means movable with each shaft to control the operativeness of the beam and a corresponding delivery power means and means to operate each shaft comprising a pinion on the shaft, a rack and motor means to actuate said rack, a circuit closer for each motor means actuated by the preceding shaft and means to reenstate the sequential operation of said shafts after the last control means has completed its operation in the preceding sequential operation.

31. A batch weighing scale comprising a plurality of scale beams, means to render said beams operable in sequence, electrically actuated power consuming devices corresponding to each beam and electrical control means for the respective power consuming devices and operated with the first means and operable only when the succeeding beam is inoperative.

32. A batch weighing scale comprising a plurality of scale beams, means to render said beams operable in sequence, electrically actuated power consuming devices corresponding to each beam and electrical control means for the respective power consuming devices and operated with the first means, each of said control means being operable only after the preceding control means has been operated.

33. A batch weighing scale comprising a plurality of scale beams, cam means operatively disposed with respect to each scale beam and movable in one direction to render the scale beam inoperative and movable in another direction to render the scale beam operative, latch means operatively disposed with respect to each cam means to prevent movement of the cam means in the direction to render the scale beam operative, engaging means operatively connected with each cam means, the engaging means of a cam means being adapted to engage the engaging means of an adjacent cam means to prevent movement of a successive cam means in a direction to render a scale beam operative until the preceding cam means has moved to render a scale beam operative.

34. A batch weighing scale comprising a plurality of scale beams, cam means operatively disposed with respect to each scale beam and movable in one direction to render the scale beam inoperative and movable in another direction to render the scale beam operative, electrical power means operatively connected with the cam means to move said cam means in one direction and power storing means operatively connected with the cam means to move said cam means in another direction.

AARON W. JOHNSON.